(12) United States Patent
Kline et al.

(10) Patent No.: US 8,930,939 B2
(45) Date of Patent: Jan. 6, 2015

(54) COMPARING SYSTEM ENGRAM WITH PRODUCT ENGRAM TO DETERMINE COMPATIBILITY OF PRODUCT WITH SYSTEM

(75) Inventors: Eric V. Kline, Rochester, MN (US); Gabriel L. M. Kline, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 13/168,956

(22) Filed: Jun. 25, 2011

(65) Prior Publication Data
US 2012/0331456 A1     Dec. 27, 2012

(51) Int. Cl.
*G06F 9/44* (2006.01)
*G06F 9/445* (2006.01)
*G06Q 10/06* (2012.01)

(52) U.S. Cl.
CPC ............ *G06F 9/445* (2013.01); *G06Q 10/06* (2013.01)
USPC ............................ 717/174; 717/168; 717/170

(58) Field of Classification Search
CPC ............... G06F 8/65; G06F 8/67; G06F 8/61; G06F 8/60
See application file for complete search history.

(56) References Cited

U.S. PATENT DOCUMENTS

| | | | | |
|---|---|---|---|---|
| 6,898,768 | B1* | 5/2005 | Theodossy et al. | 716/111 |
| 7,424,719 | B2* | 9/2008 | Duplichan | 717/174 |
| 7,537,158 | B1* | 5/2009 | Cox et al. | 235/385 |
| 7,673,052 | B2* | 3/2010 | Fried et al. | 709/226 |
| 7,735,079 | B1* | 6/2010 | Davis et al. | 717/174 |
| 7,743,365 | B2 | 6/2010 | Wehrs et al. | |
| 7,792,941 | B2* | 9/2010 | Fried et al. | 709/223 |
| 7,882,221 | B2* | 2/2011 | Sailer et al. | 709/224 |
| 7,956,749 | B2* | 6/2011 | Hartwig et al. | 340/572.1 |
| 7,984,436 | B1* | 7/2011 | Murray | 717/175 |
| 8,078,909 | B1* | 12/2011 | Satish | 714/15 |
| 8,146,075 | B2* | 3/2012 | Mahajan | 717/170 |
| 8,194,985 | B2* | 6/2012 | Grigsby et al. | 382/218 |
| 8,209,528 | B2* | 6/2012 | Rogers et al. | 713/2 |
| 8,365,161 | B2* | 1/2013 | Komano | 717/174 |

(Continued)

OTHER PUBLICATIONS

Yang et al., "Applying constraint satisfaction approach to solve product configuration problems with cardinality-based configuration rules", 2011 Springer, pp. 99-111; <http://link.springer.com/article/10.1007%2Fs10845-011-0544-2>.*

(Continued)

*Primary Examiner* — Thuy Dao
*Assistant Examiner* — Ben C Wang
(74) *Attorney, Agent, or Firm* — Damion Josephs

(57) ABSTRACT

Information includes states that are each representable by a number and that each corresponds to a characteristic. Each characteristic is assigned an index integer of an index, and has potential states from which the state corresponding to the characteristic is specified within the information. An engram value for each characteristic is equal to the number representing the state corresponding to the characteristic multiplied by a state base value for the characteristic. The state base value for each characteristic is equal to a base value to the power of the index integer assigned to the characteristic. The base value is identical for all the characteristics. An engram is based on the engram values for the characteristics. Engrams can be generated and can be compared to one another, to, for instance, determine whether a product can be compatibly installed in relation to a target system.

20 Claims, 3 Drawing Sheets

(56) References Cited

U.S. PATENT DOCUMENTS

| | | | |
|---|---|---|---|
| 8,713,560 B2* | 4/2014 | Neumann et al. | 717/174 |
| 8,725,839 B2* | 5/2014 | Madduri et al. | 717/174 |
| 2003/0227477 A1 | 12/2003 | Kadiwala | |
| 2005/0011958 A1* | 1/2005 | Fukasawa et al. | 235/462.46 |
| 2006/0020922 A1* | 1/2006 | Takizawa | 717/168 |
| 2006/0168576 A1* | 7/2006 | Phung et al. | 717/168 |
| 2008/0048044 A1* | 2/2008 | Zhao et al. | 235/494 |
| 2008/0127161 A1* | 5/2008 | Atas et al. | 717/168 |
| 2008/0228503 A1 | 9/2008 | Buchheit | |
| 2008/0235372 A1* | 9/2008 | Sailer et al. | 709/224 |
| 2008/0269938 A1* | 10/2008 | Meaney et al. | 700/116 |
| 2009/0144719 A1* | 6/2009 | Pazdziora | 717/171 |
| 2009/0228694 A1* | 9/2009 | Karstens | 713/1 |
| 2009/0259515 A1* | 10/2009 | Belimpasakis et al. | 705/10 |
| 2009/0307487 A1* | 12/2009 | Movva et al. | 713/156 |
| 2010/0086192 A1* | 4/2010 | Grigsby et al. | 382/141 |
| 2010/0274998 A1* | 10/2010 | Rogers et al. | 713/2 |
| 2011/0154317 A1* | 6/2011 | Madduri et al. | 717/174 |
| 2011/0209133 A1* | 8/2011 | Mahajan et al. | 717/170 |
| 2011/0302201 A1* | 12/2011 | Ogaz et al. | 707/769 |
| 2012/0017205 A1* | 1/2012 | Mahajan | 717/170 |
| 2012/0163150 A1* | 6/2012 | Itagaki et al. | 369/85 |
| 2012/0183185 A1* | 7/2012 | Grigsby et al. | 382/128 |
| 2012/0303356 A1* | 11/2012 | Boyle et al. | 704/9 |
| 2012/0323729 A1* | 12/2012 | Kline | 705/26.8 |
| 2013/0060662 A1* | 3/2013 | Carlson et al. | 705/26.61 |
| 2013/0167135 A1* | 6/2013 | Neumann et al. | 717/174 |
| 2013/0185706 A1* | 7/2013 | Dominick | 717/168 |
| 2014/0123120 A1* | 5/2014 | Holmberg et al. | 717/168 |
| 2014/0189676 A1* | 7/2014 | Mahajan | 717/170 |

OTHER PUBLICATIONS

Karimpour et al., "Bi-criteria Genetic Search for Adding New Features into an Existing Product Line", 2013 IEEE, CMSBSE 2013, San Francisco, CA, pp. 34-38; <http://ieeexplore.ieee.org/stamp/stamp.jsp?tp=&arnumber=6604434>.*

Durillo et al., "jMetal: A Java framework for multi-objective optimization", Jun. 12, 2011 Elsevier Ltd., pp. 760-771; <http://www.sciencedirect.com/science/article/pii/S0965997811001219#>.*

Yang et al., "A dynamic constraint satisfaction approach for configuring structural products under mass customization", Aug. 9, 2012, Elsevier Ltd., pp. 1723-1737; <http://www.sciencedirect.com/science/article/pii/S0952197612001984#>.*

Mendonça et al., "Decision-Making Coordination in Collaborative Product Configuration", 2008 ACM, SAC'08, Mar. 16-20, 2008, Fortaleza, Ceará, Brazil, pp. 108-113; <http://dl.acm.org/ft_gateway.cfm?id=1363715&ftid=511522&coll=DL&dl=GUIDE&CFID=400009053&CFTOKEN=90567657>.*

* cited by examiner

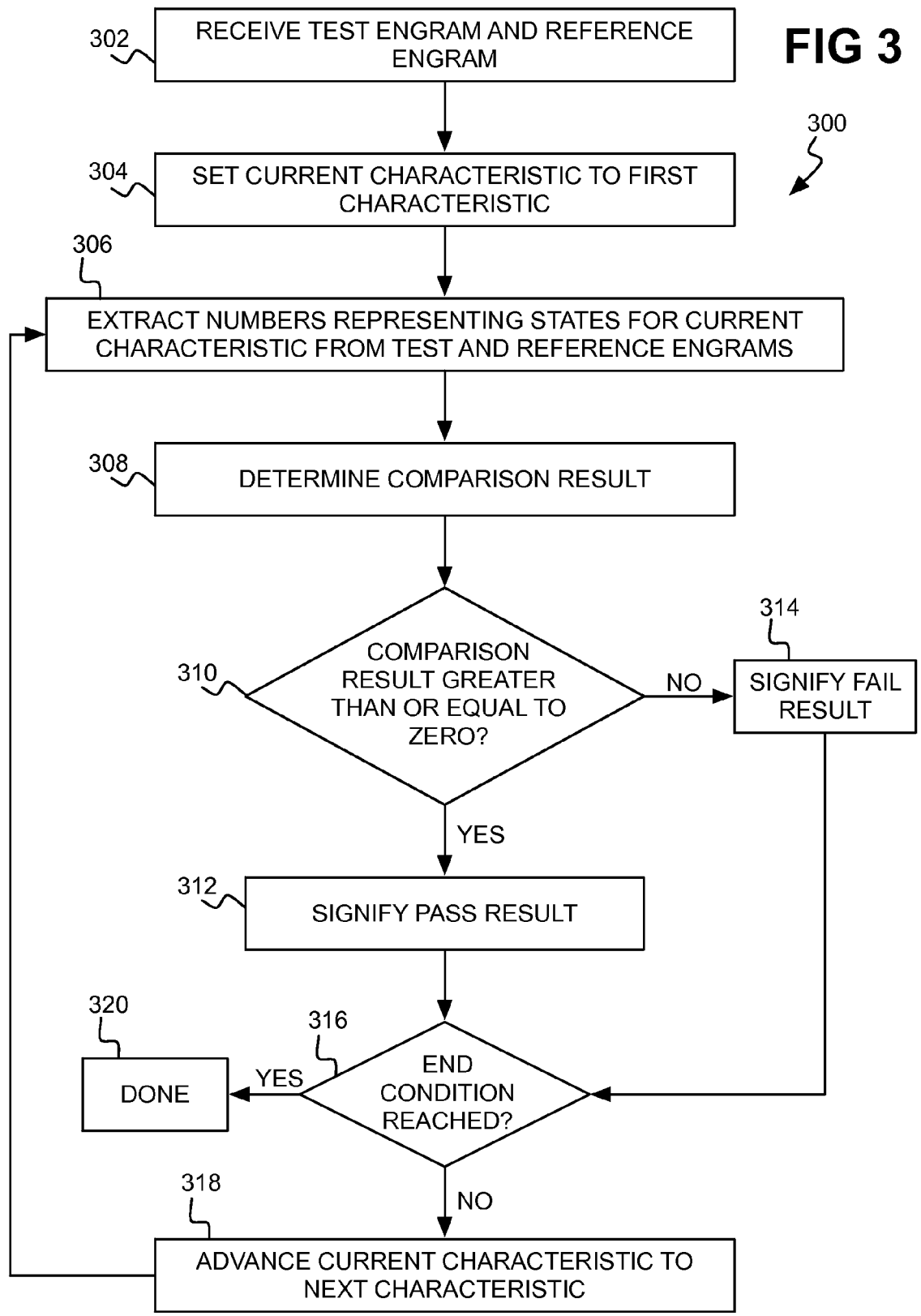

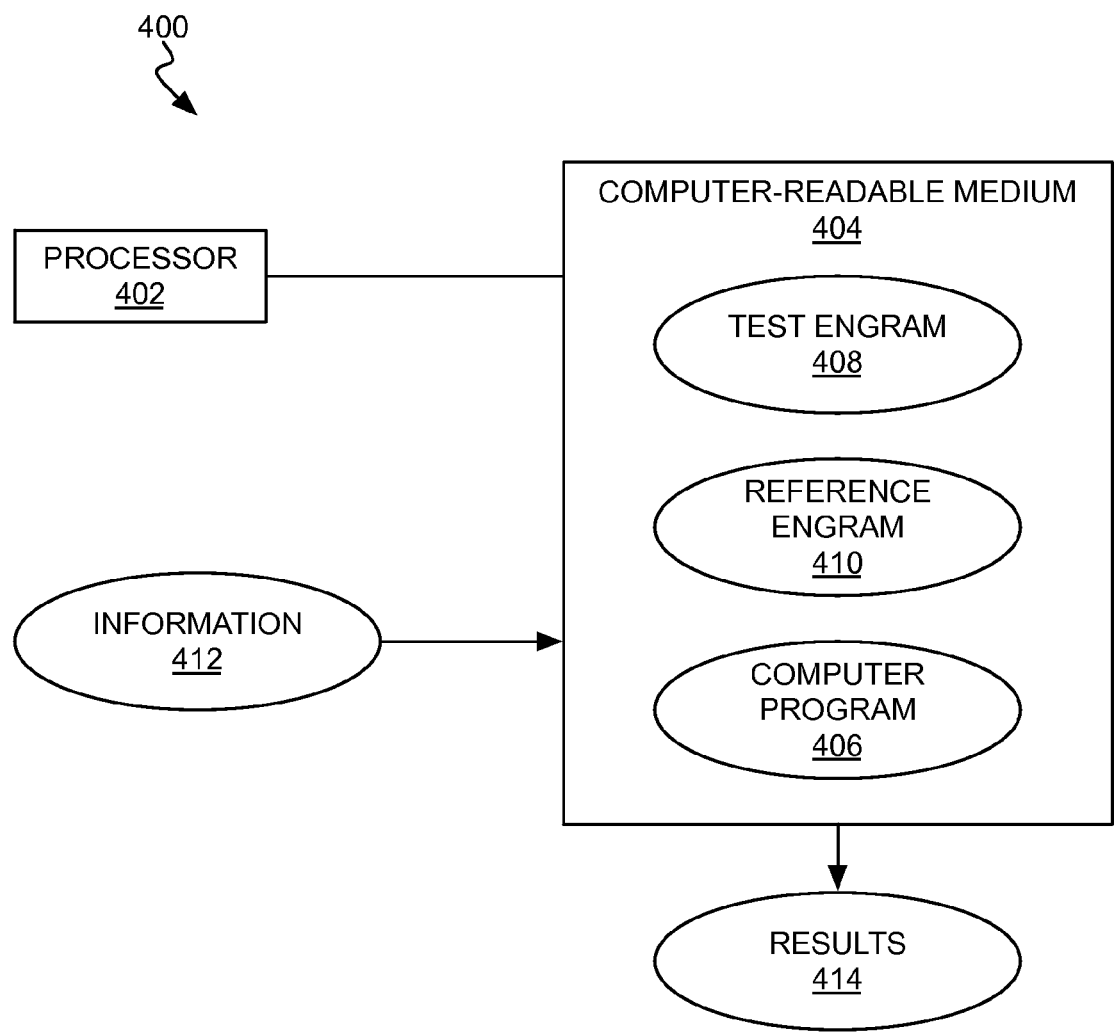

COMPARING SYSTEM ENGRAM WITH PRODUCT ENGRAM TO DETERMINE COMPATIBILITY OF PRODUCT WITH SYSTEM

RELATED APPLICATIONS

The present patent application is related to the patent application entitled "comparing system engram with product engram to determine compatibility of product with system," assigned Ser. No. 13/168,955 and filed on Jun. 25, 2011, and which is hereby incorporated by reference.

BACKGROUND

It is commonplace for a user to want to install new software and/or upgrade existing software within an existing computing system, as well as install new hardware and/or upgrade existing hardware within such a computing system. For example, a user may wish to install a new computer program that provides functionality not provided by any existing software within a computing system, and/or upgrade an existing computer program already installed within the computing system with a newer version of this software. As another example, a user may wish to install a new hardware component that provides functionality not provided by any existing hardware within a computing system, and/or upgrade an existing hardware component already installed within the computing system with a different version of this hardware.

SUMMARY

A method for encoding information into an engram of an embodiment of the invention includes receiving the information by a processor. The information includes states that are each representable by a number and that each corresponding to a characteristic. Each characteristic is assigned an index integer of an index, and includes potential states from which the state corresponding to the characteristic is specified within the information. The method includes, for each characteristic, generating by the processor an engram value for the characteristic. The engram value is equal to the number representing the state corresponding to the characteristic multiplied by a state base value for the characteristic. The state base value for the characteristic is equal to a base value to the power of the index integer assigned to the characteristic. The base value is identical for all the characteristics. The method includes generating the engram by the processor based on the engram values for the characteristics, and outputting the engram by the processor.

A computer program product of an embodiment of the invention includes a computer-readable storage medium having computer-readable code embodied therein. The computer-readable code is executable by a processor. The computer-readable code includes first computer-readable code to receive a test engram and a reference engram against which the test engram is to be compared. The test engram encodes first information, and the reference engram encodes second information.

The first information includes first states that are each representable by a number, and that each corresponds to a characteristic. Each characteristic is assigned an index integer of an index. Each characteristic includes potential states from which the first state corresponding to the characteristic is specified within the first information. The second information includes second states that are each representable by a number, and that each corresponds to one of the characteristics. Each second state is specified within the second information as one of the potential states of the characteristic to which the second state corresponds.

The test engram is based on first engram values corresponding to the characteristics. Each first engram value is equal to the number representing the first state corresponding to the characteristic multiplied by a state base value for the characteristic. The state base value for the characteristic is equal to a base value to the power of the index integer assigned to the characteristic. The base value is identical for all the characteristics. The reference engram is based on second engram values corresponding to the characteristics. Each second engram value is equal to the number representing the second state corresponding to the characteristic multiplied by the state base value for the characteristic.

The computer-readable code includes second computer-readable code. The second computer-readable code is to compare the test engram against the reference engram by, for each characteristic until an end condition has been reached, determining a comparison result. The comparison result is determined as equal to the number representing the first state corresponding to the characteristic minus the number representing the second state corresponding to the characteristic.

A system of an embodiment of the invention includes a processor, a computer-readable medium to store a system engram and a product engram against which the system engram is to be compared, and a computer program stored on the computer-readable medium and executable by the processor. The test engram encodes an existing configuration of a target system. The existing configuration includes one or more of hardware and software of the system. The product engram encodes a required configuration of the target system for a product to be compatibly installed in relation to the target system. The required configuration includes one or more of required hardware and required software within the target system for the product to be compatibly installed in relation to the target system.

The existing configuration includes first states that are each representable by a number, and that each corresponds to a characteristic. Each characteristic is assigned an index integer of a plurality of index integers of an index, and has potential states from which the first state corresponding to the characteristic is specified within the existing configuration. The required configuration includes second states that are each representable by a number, and that each corresponds to one of the characteristics. Each second state is specified within the required configuration as one of the potential states of the characteristic to which the second state corresponds.

The system engram is based on first engram values corresponding to the characteristics. Each first engram value is equal to the number representing the first state corresponding to the characteristic multiplied by a state base value for the characteristic. The state base value for the characteristic is equal to a base value to the power of the index integer assigned to the characteristic. The base value is identical for all the characteristics. The product engram is based on second engram values corresponding to the characteristics. Each second engram value is equal to the number representing the second state corresponding to the characteristic multiplied by the state base value for the characteristic.

The computer program is to compare the test engram against the reference engram. For each characteristic until an end condition has been reached, the computer program determines a comparison result. The comparison result is determined as equal to the number representing the first state corresponding to the characteristic minus the number representing the second state corresponding to the characteristic.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 3 is a flowchart of a method for comparing a test engram against a reference engram, according to an embodiment of the invention.

FIG. 4 is a diagram of a representative system, according to an embodiment of the invention.

DETAILED DESCRIPTION

Figures 1, 2:
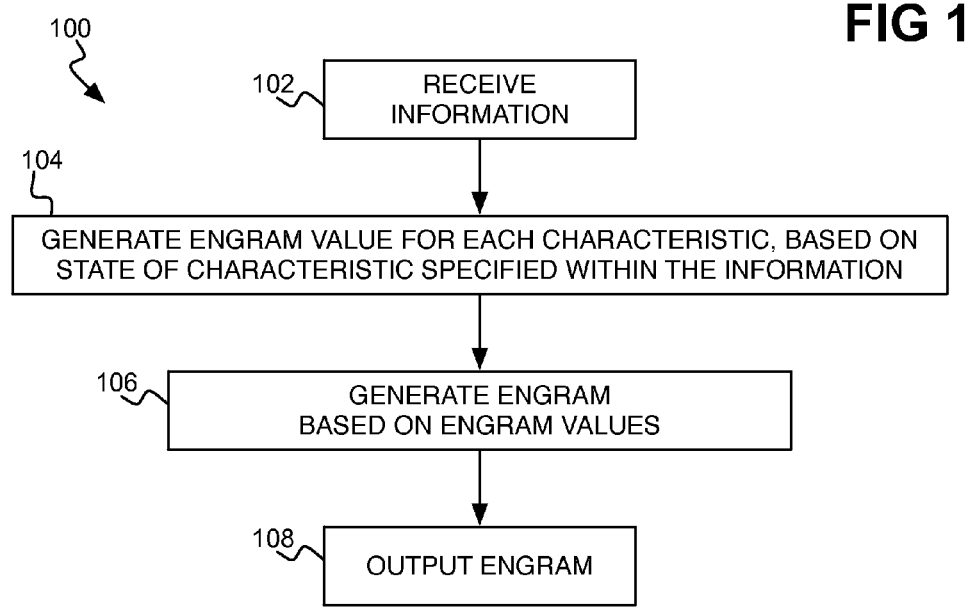
FIG. 1 is a flowchart of a method for encoding information within an engram, according to an embodiment of the invention.
FIG. 2 is a diagram of a computer program routine for extracting a number assigned to or representing a state from an engram, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a user may want to install new software and/or upgrade existing software within an existing computing system, as well as install new hardware and/or upgrade existing hardware within such a computing system. The new software, upgraded software, new hardware, and upgraded hardware can each be generically referred to as a product. To install such a product in relation to an existing system, the product has to be compatible with the existing system.

For instance, some types of processors are compatible only with certain types of mainboards. Therefore, a particular type of processor may not be able to be installed within a particular type of mainboard. As another example, some software is compatible only with certain types of operating systems, or within a particular type of operating system having a minimum version. In general, an existing system has a configuration, whereas a product has a required configuration that the existing system must satisfy in order for the product to be compatible with this system.

However, it is difficult for users to keep track of the configurations of their existing systems, and to know what required configurations products need to be compatibly installed within these existing systems. This is particularly the case for products that have required configurations that are complex. For example, a product may be compatible with a system that has a certain version of an operating system if there is also a sufficiently fast processor, but may still be compatible with a system that has an older version of this operating system if the processor is even faster still.

The patent application that has been incorporated by reference above alleviates a user from having to assess whether a product is compatible with a given target system. A system engram that encodes the existing configuration of the target system is received. The existing configuration includes the hardware and/or software of the target system. The system engram is compared with a product engram. The product engram encodes a required configuration of the target system for the product to be compatibly installed in relation to the target system. The required configuration includes the hardware and/or software required within the target system for such compatible installation to occur.

Disclosed herein are techniques to generate and compare such engrams. It is noted that while these engrams can be employed in relation to determining compatibility information of a target system and a product, as described in the patent application that has been incorporated by reference above, these techniques are applicable to other implementations in which the generation and/or comparison of engrams is desirable. The techniques disclosed herein specify particular types of engrams that encode information, such as an existing configuration of a target system, a required configuration of the target system for a product to be compatibly installed in relation to the target system, or other types of information.

An engram E encoding information is based on a number of engram values $\{e_x\}$, for $x=0 \ldots X$, where there is an index having an index value $x=0 \ldots X$. Each engram value $e_x$ is for a characteristic, and is equal to $BI^X N_x$. In the engram value for a characteristic, a base integer BI, such as ten, is raised to a power of the index value x, and this result $BI^x$, which is referred to as the state base value for the characteristic, is multiplied by $N_x$, which is an integer or other real number representing a state of the corresponding characteristic having the index value x within the information encoded by the engram E. The information encoded within the engram E has states corresponding to the characteristics. Each characteristic has a number of potential states from which the state corresponding to the characteristic is specified within the information.

It is noted that the base integer is more generally a base value, and can be any real or imaginary number. However, for the remainder of the detailed description, the embodiment in which the base value is a base integer is described. However, it can be appreciated that this description is also applicable to the base integer being any type of base value.

The engram E itself is based on the engram values $\{e_x\}$, for index values $x=0 \ldots X$, in a number of different ways. For instance, the engram E may simply be considered the set of engram values, or $E=\{e_0, e_1, \ldots, e_X\}=\{N_0 BI^0, N_1 BI^1, \ldots, N_X BI^X\}$. As another example, the engram E may be a summation of the individual engram values, or $E=\Sigma^X_{x=0} e_x = \Sigma^X_{x=0} N_x BI^x$.

An illustrative example is as follows. A processor of a target system may be any of five types A, B, C, D, and E, and may specifically be a processor of type D. The particular characteristic corresponding to processor type may be indexed by an index value $x=3$. The potential states of this characteristic are the processor types A, B, C, D, and E, and may be represented by the integers 1, 2, 3, 4, and 5, respectively. The engram value of the engram for the target system corresponding to the processor type characteristic thus has a state $N_3$ represented by the number 4 corresponding to the processor type D. As such, the engram value for the processor type characteristic within the engram for the target system is equal to $10^3 \times 4$, for the case where the base integer BI is equal to ten.

The information encoded by an engram may be the configuration of a system, as noted above, such as the existing configuration of the system, or the required configuration of the system for a given product to be compatibly installed in relation to the system. The characteristics of this information are encoded within the engram. The characteristics can include attribute variables, parametric variables, and hybrid variables, the latter which are hybrid attribute-and-parametric variables.

The potential states for an attribute variable include non-numeric, qualitative, discrete, and discontinuous states. For instance, an attribute variable may be a processor type, a memory type, a graphics adapter type, an operating system type, an operating system revision, or an operating system patch. The n potential states for an attribute variable may thus be expressed as a set $\{PS_1, PS_2, \ldots, PS_n\}$, where each $PS_i, i=1 \ldots n$ is a discrete, qualitative, and non-numeric state. The information encoded by an engram may thus take on an actual state $N_x=PS_i$, $i=1 \ldots n$, where x is the index value for the attribute variable.

The potential states for a parametric variable include continuous and numeric states. For instance, a parametric value may be memory size, free memory available, storage device capacity, or storage device capacity available. The potential states for a parametric variable may thus be expressed as a numeric range [LL ... UL], where LL specifies the lower limit of the range, and UL specifies the upper limit of the range. The information encoded by an engram may thus take on an actual state $N_x=S$, $S \in [LL \ldots UL]$, where x is the index value for the parametric variable.

For example, for a parametric variable corresponding to storage device capacity available for a storage device having a total capacity of UL, the state $N_x=S$, $S \in [0 \ldots UL]$, because the amount of capacity available can be between zero, corresponding to no capacity available, and UL, corresponding to all capacity available.

The potential states for a hybrid variable include numeric, qualitative, discrete, and discontinuous states. For instance, a hybrid variable may be processor speed, memory speed, or graphics adapter speed. The potential states for a hybrid variable may be expressed as a set of numeric values and/or numeric ranges $\{PS_1, PS_2, \ldots, PS_n\}$, where each $PS_i$, $i=1 \ldots n$ is a range $[LL_i \ldots UL_i]$, or is a single numeric value that can be expressed as the reductive range $[LL_i \ldots LL_i]$ or $[UL_i \ldots UL_i]$. The information encoded by an engram may thus take on an actual state $N_x \in PS_i$, $i=1 \ldots n$, where x is the index value for the hybrid variable. For example, for a hybrid variable corresponding to processor speed, where the processor speed may be between 1.6 and 1.8 gigahertz (GHz), or may be equal to 2.0 GHz, or may be between 2.2 and 2.4 GHz, then state $N_x=S$, $S \in \{[1.6 \ldots 1.8], 2.0, [2.2 \ldots 2.4]\}$.

Characteristics having higher index values x can have more potential states than characteristics having lower index values x. In general, the number of potential states that a characteristic having an index value x can have is $BI^{x+1}-BI^x$. Thus, a characteristic having an index value x=0 can have nine potential states, whereas a characteristic having an index value x=5 can have 900,000 potential states.

FIG. 1 shows a method 100 for encoding information into an engram, according to an embodiment of the invention. The method 100 can be performed by a processor, such as a processor of a processing device like a computing device. Examples of computing devices include desktop and laptop computers, as well as devices like smartphones, and other types of computing devices and processing devices.

The method 100 receives information (102). The information includes a state for each of a number of characteristics. For instance, the information may correspond to the existing configuration of a system. The system may have existing hardware and/or software. For each type of hardware and software, there may be one or more characteristics. For example, for the processor of the system, there may be an attribute variable specifying the type of the processor, an attribute variable that specifies the number of processing cores within the processor, a hybrid variable specified the speed of the processor.

For each characteristic, the method 100 generates an engram value for the characteristic, based on the state of the characteristic as specified within the information (104). As noted above, each characteristic is assigned an index value, or integer, and each characteristic has a number of potential states from which the state corresponding to the characteristic is specified within the information that has been received. The engram value is generated equal to a number representing the state corresponding to the characteristic within the information that has been received, multiplied by a state base value for the characteristic. The state base value for the characteristic is equal to the base integer that is raised to the power of the index value, or integer, that has been assigned to the characteristic.

The method 100 generates the engram itself based on the engram values that have been generated for the characteristics (106). The method 100 can then output the engram (108). For instance, the engram may be electronically transmitted over a network, may be printed as a hardcopy on a printable medium like paper, may be electronically stored on an electronic medium, or may be output in a different manner.

Two engrams can be compared to compare the information contained in each engram on a characteristic-by-characteristic basis. Specifically, what is referred to as a test engram is compared against what is referred to as a reference engram. The test engram may be a system engram encoding the existing configuration of a target system, for instance, whereas the reference engram may be a product engram encoding the required configuration of the target system for a product to be compatibly installed in relation to the target system. To achieve such a comparison, the states for the configurations have to be extracted from each of the test engram and the reference engram.

In the case where an engram E is a set of engram values $E=\{e_0, e_1, \ldots, e_X\}=\{N_0 BI^0, N_1 BI^1, \ldots, N_X BI^X\}$, extraction of the engram values is easily accomplished, since each engram value is a member of the set of engram values that makes up the engram. However, where the engram E is a summation of the engram values or $E=\Sigma^X_{x=0} e_x = \Sigma^X_{x=0} N_x BI^x$, extraction of the engram values is more difficult. The description that follows in reference to FIG. 2 is one approach by which such extraction may be achieved.

FIG. 2 thus shows a computer program routine exemplified by pseudo-code to extract from an engram E the number $N_x$ assigned to the state for the characteristic having the index value x, according to an embodiment of the invention. In the computer program routine of FIG. 2, the total number of characteristics for which states can be encoded in an engram is specified as X+1. Furthermore, the TRUNCATE( ) function truncates a real number to an integer without rounding. For instance, both the real numbers 2.412 and 2.5001 are truncated to the integer 2 by this function.

The computer program routine is operable where the numbers that are assigned to potential states of characteristics are integers. Where the numbers that are assigned to potential states of characteristics can more generally be real numbers, the number $N_x$ assigned to the state for a characteristic having the index value x can be extracted from an engram in a different way, according to another embodiment of the invention. In this other embodiment, the individual engram values have to be known. As described above, an engram has an engram value for a characteristic having an index value x that is equal to the number $N_x$ assigned to the state encoded within the engram, multiplied by the state base value $BI^X$ for the characteristic having an index value x. In this embodiment, then, the number $N_x$ assigned to the state is extracted from the engram value for the characteristic having an index value x by dividing this engram value by the state base value $BI^X$ for the characteristic having an index value x.

Once the number assigned to the state for a characteristic has been extracted from each of the test engram and the reference engram, the two numbers can be compared to one another to determine whether the test engram passes or fails with respect to the reference engram for this characteristic. Specifically, a comparison result is determined by comparing the number assigned to the state for this characteristic within the reference engram to the number assigned to the state for this characteristic within the test engram. Specifically, the comparison result can be determined by subtracting the number assigned to the state for the characteristic within the reference engram from the number assigned to the state for the characteristic within the test engram. Depending on the comparison result, a pass result or a fail result can be signified.

A comparison result may signify a pass result only where the state for a characteristic encoded within the test engram represents at least as high of a state for this characteristic as encoded within the reference value. As such, a pass result may be specified if the comparison result is equal to or greater than zero. If the comparison result is less then zero, a fail result may be specified.

It deserves emphasis that the test engram and the reference engram are compared on an engram value-by-engram value basis, or more particularly, on a characteristic-by-characteristic basis. That is, the state of a characteristic to which an engram value of the test engram corresponds is compared to the state of the same characteristic to which a corresponding engram value of the reference engram corresponds. This engram value-by-engram value, or characteristic-by-characteristic value, basis for comparison is achieved by first extracting the engram values, and thus the states of the characteristics to which the engram values correspond, from each engram.

For example, a particular engram value of a test engram may be $7 \times 10^3$, where x=3, BI=10, and $N_3$=7. This engram value is therefore for the characteristic having the index value x=3, where the state encoded in this engram value for this characteristic is $N_3$=7. The corresponding engram value of a reference engram may be $4 \times 10^3$, where x=3, BI=10, and $N_3$=4. As such, this engram value is also for the characteristic having the index value x=3, where the state encoded in this engram value for this characteristic is $N_3$=4. The two numbers 7 and 4 are compared to one another. Since 7−4=3 is not negative, the comparison may yield a pass result.

FIG. 3 shows a method 300 for comparing a test engram against a reference engram, according to an embodiment of the invention. As with the method 100, the method 300 can be performed by a processor. The test engram and the reference engram are received (302). A current characteristic is set to a first characteristic for which states are encoded within the engrams as numbers (304). For instance, if there are X+1 total characteristics having index values x=0 . . . X, then the current characteristic is set to the characteristic having the index value x=0.

The number representing the state corresponding to the current characteristic is extracted from the test engram, and the number representing the state corresponding to the current characteristic is extracted from the reference engram (306).

Such extraction can be achieved as has been described above. A comparison result is then determined (308). The comparison result is determined by subtracting the number extracted from the reference engram from the number extracted from the test engram (310). The comparison result is a real number that is less than zero, equal to zero, or greater than zero.

If the comparison result is equal to or greater than zero (310), then a pass result is signified (312). If the comparison result is less than zero (310), a fail result is signified (314). For instance, the test engram may encode an existing configuration of a target system, whereas the reference engram may encode a required configuration of the target system for a product to be compatibly installed in relation to the target system. In this example, a pass result signifies that the existing configuration satisfies the required configuration as to the current characteristic being evaluated, whereas a fail result signifies that the existing configuration does not satisfy the required configuration as to the current characteristic.

From either part 312 or part 314, if an end condition has not been reached (316), then the current characteristic is advanced to the next characteristic (318), and the method 300 is repeated at part 306. For instance, the index value of the current characteristic may be incremented by one in part 318. However, if the end condition has been reached (316), then the method 300 is finished (320).

The end condition in one embodiment can be that the current characteristic is the last characteristic for which states are encoded within the test engram and the reference engram. For instance, this end condition can be specified as the index value of the current characteristic being equal to X. If this end condition is the only end condition, then this means that the states encoded within the test engram and the reference engram for all the characteristics will be evaluated on a characteristic-by-characteristic basis, via successive iterations within the method 300. That is, in this embodiment, all the characteristics will be evaluated, regardless if any such evaluation causes a fail result to be signified.

In another embodiment, the end condition can additionally be that a fail result has been signified for the current characteristic. If this end condition is also specified, then this means that the states encoded within the test engram and the reference engram for the characteristics will be evaluated on a characteristic-by-characteristic basis, via successive iterations within the method 300, until either a fail result is signified in part 314, or until all the characteristics have been evaluated. That is, in this embodiment, all the characteristics will be evaluated only if none of the evaluations causes a fail result to be signified.

It is noted that in the embodiment in which an engram is represented as a summation of engram values, the comparison performed in the method 300 can be achieved on a digit-by-digit basis. For instance, consider a case where the test engram has a summation value of 4,136,278, and the reference engram has a summation value 5,156,278. Each digit of the test engram is compared to the corresponding digit of the reference engram, such that four is compared to five, one is compared to one, three is compared to five, six is compared to six, and so on. As such, the comparison result is −1, 0, −2, 0, 0, 0, 0 in this example.

FIG. 4 shows a rudimentary system 400, according to an embodiment of the invention. The system 400 can be implemented as or over one or more computing devices, such as computers. The system 400 includes at least a processor 400 and a computer-readable medium 404.

The computer-readable medium 404 stores a computer program 406, and can also store a test engram 408 and/or a reference engram 410. The computer program 406 is executed by the processor 402. The computer program 406 results in the method 100 and/or the method 300 being performed.

For instance, when the method 100 is performed by the computer program 406, the test engram 408 and/or the reference engram 410 is generated based on information 412. When the method 300 is performed by the computer program 406, the test engram 408 is compared against the reference engram 410 to generate results 414. The results 414 can include the comparison results described in relation to part 308 of the method 300, and/or the pass results and the fail results described in relation to parts 312 and 314, respectively, of the method 300.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention.

In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   receiving information by a processor, the information comprising a plurality of states, each state representable by a number, each state corresponding to a characteristic of a plurality of characteristics, each characteristic assigned an index integer of a plurality of index integers of an index, each characteristic having a plurality of potential states from which the state corresponding to the characteristic is specified within the information;
   for each characteristic, generating by the processor an engram value for the characteristic, the engram value equal to the number representing the state corresponding to the characteristic multiplied by a state base value for the characteristic, the state base value for the characteristic equal to a base value to the power of the index integer assigned to the characteristic, the base value identical for all the characteristics;
   generating a first engram by the processor based on the engram values for the characteristics;
   comparing the first engram against a second engram, by the processor, by, for each characteristic until an end condition has been reached, determining a comparison result equal to the number representing the state corresponding to the characteristic within the information encoded into the first engram with a corresponding number representing the state corresponding to the characteristic within other information encoded into the second engram; and
   outputting one or more of the comparison results, by the processor.

2. The method of claim 1, wherein the information comprises one of:
   an existing configuration of a target system, such that the first engram is a system engram, and the second engram is a product engram such that the other information comprises a required configuration of the target system for a product to be compatibly installed in relation to the target system;
   the required configuration of the target system for the product to be compatibly installed in relation to the target system, such that the engram is the product engram, and the second engram is the system engram and the other information comprises the existing configuration of the target system.

3. The method of claim 1, wherein the number representing each state is one or more of a real number and an integer, and the base value that is identical for all the characteristics is ten.

4. The method of claim 1, wherein one or more of the characteristics are attribute variables, the potential states for each attribute variable comprising a plurality of non-numeric, qualitative, discrete, and discontinuous states.

5. The method of claim 4, wherein the attribute variables comprise one or more of: processor type; memory type; graphics adapter type; operating system type; operating system revision; operating system patch.

6. The method of claim 1, wherein one or more of the characteristics are parametric variables, the potential states for each parametric variable comprising a plurality of continuous and numeric states.

7. The method of claim 6, wherein the parametric variables comprise one or more of: memory size; free memory available; storage device capacity; storage device capacity available.

8. The method of claim 1, wherein one or more of the characteristics are hybrid attribute-and-parametric variables, the potential states for each hybrid attribute-and-parametric variable comprising a plurality of numeric, qualitative, discrete, and discontinuous states.

9. The method of claim 8, wherein the hybrid attribute-and-parametric variables comprise one or more of: processor speed and type; memory speed and type; graphics adapter speed and type.

10. A computer program product comprising:
    a storage memory device storing computer-readable code executable by a processor, the computer-readable code comprising:
      first computer-readable code to receive a test engram and a reference engram against which the test engram is to be compared, the test engram encoding first information, the reference engram encoding second information,
      the first information comprising a plurality of first states, each first state representable by a number, each first state corresponding to a characteristic of a plurality of characteristics, each characteristic assigned an index integer of a plurality of index integers of an index, each characteristic having a plurality of potential states from which the first state corresponding to the characteristic is specified within the first information,
      the second information comprising a plurality of second states, each second state representable by a number, each second state corresponding to one of the characteristics, each second state specified within the second information as one of the potential states of the characteristic to which the second state corresponds,
      the test engram based on a plurality of first engram values corresponding to the characteristics, each first engram value equal to the number representing the first state corresponding to the characteristic multiplied by a state base value for the characteristic, the state base value for the characteristic equal to a base value to the power of the index integer assigned to the characteristic, the base value identical for all the characteristics,
      the reference engram based on a plurality of second engram values corresponding to the characteristics, each second engram value equal to the number representing the second state corresponding to the characteristic multiplied by the state base value for the characteristic; and,
      second computer-readable code to compare the test engram against the reference engram by, for each characteristic until an end condition has been reached, determining a comparison result equal to the number representing the first state corresponding to the characteristic minus the number representing the second state corresponding to the characteristic.

11. The computer program product of claim 10, wherein the test engram is a system engram, the first information is an existing configuration of a target system, the reference engram is a product engram, and the second information is a required configuration of the target system for a product to be compatibly installed in relation to the target system.

12. The computer program product of claim 10, wherein the number representing each state is one or more of a real number and an integer, and the base value that is identical for all the characteristics is ten.

13. The computer program product of claim 10, wherein the computer-readable code comprises third computer-readable code to, for each characteristic until the end condition has been reached:
   signal a pass result for the characteristic where the comparison result is equal to or greater than zero; and,
   signal a fail result for the characteristic where the comparison result is less than zero.

14. The computer program product of claim 10, wherein the end condition is one or more of:
   the comparison results having been determined for all the characteristics;
   the comparison result of any characteristic being less than zero.

15. The computer program product of claim 10, wherein one or more of the characteristics are attribute variables, the potential states for each attribute variable comprising a plurality of non-numeric, qualitative, discrete, and discontinuous states,
   wherein one or more of the characteristics are parametric variables, the potential states for each parametric variable comprising a plurality of continuous and numeric states,
   and wherein one or more of the characteristics are hybrid attribute-and-parametric variables, the potential states for each hybrid attribute-and-parametric variable comprising a plurality of numeric, qualitative, discrete, and discontinuous states.

16. The computer program product of claim 15, wherein one or more of:
   the attribute variables comprise one or more of: processor type; memory type; graphics adapter type; operating system type; operating system revision; operating system patch;
   the parametric variables comprise one or more of: memory size; free memory available; storage device capacity; storage device capacity available;
   the hybrid attribute-and-parametric variables comprise one or more of: processor speed and type; memory speed and type; graphics adapter speed and type.

17. A system comprising:
   a processor;
   a computer-readable medium to store a system engram and a product engram against which the system engram is to be compared, the system engram encoding an existing configuration of a target system, the existing configuration including one or more of hardware and software of the system, the product engram encoding a required configuration of the target system for a product to be compatibly installed in relation to the target system, the required configuration including one or more of required hardware and required software within the target system for the product to be compatibly installed in relation to the target system,
   the existing configuration comprising a plurality of first states, each first state representable by a number, each first state corresponding to a characteristic of a plurality of characteristics, each characteristic assigned an index integer of a plurality of index integers of an index, each characteristic having a plurality of potential states from which the first state corresponding to the characteristic is specified within the existing configuration,
   the required configuration comprising a plurality of second states, each second state representable by a number, each second state corresponding to one of the characteristics, each second state specified within the required configuration as one of the potential states of the characteristic to which the second state corresponds,
   the system engram based on a plurality of first engram values corresponding to the characteristics, each first engram value equal to the number representing the first state corresponding to the characteristic multiplied by a state base value for the characteristic, the state base value for the characteristic equal to a base value to the power of the index integer assigned to the characteristic, the base value identical for all the characteristics,
   the product engram based on a plurality of second engram values corresponding to the characteristics, each second engram value equal to the number representing the second state corresponding to the characteristic multiplied by the state base value for the characteristic; and,
   a computer program stored on the computer-readable medium and executable by the processor to compare the system engram against the product engram by, for each characteristic until an end condition has been reached, determining a comparison result equal to the number representing the first state corresponding to the characteristic minus the number representing the second state corresponding to the characteristic.

18. The system of claim 17, wherein the number representing each state is one or more of a real number and an integer, and the base value that is identical for all the characteristics is ten.

19. The system of claim 17, wherein the computer program is to, for each characteristic until the end condition has been reached:
   signal a pass result for the characteristic where the comparison result is equal to or greater than zero, the pass result signifying that the existing configuration satisfies the required configuration as to the characteristic; and,
   signal a fail result for the characteristic where the comparison result is less than zero, the fail result signifying that the existing configuration does not satisfy the required configuration as to the characteristic,
   and wherein the end condition is one or more of:
   the comparison results having been determined for all the characteristics;
   the comparison result of any characteristic being less than zero.

20. The system of claim 17, wherein one or more of the characteristics are attribute variables, the potential states for each attribute variable comprising a plurality of non-numeric, qualitative, discrete, and discontinuous states,
   wherein one or more of the characteristics are parametric variables, the potential states for each parametric variable comprising a plurality of continuous and numeric states, wherein one or more of the characteristics are hybrid attribute-and-parametric variables, the potential states for each hybrid attribute-and-parametric variable comprising a plurality of numeric, qualitative, discrete, and discontinuous states,
and wherein one or more of:
- the attribute variables comprise one or more of: processor type; memory type; graphics adapter type; operating system type; operating system revision; operating system patch;
- the parametric variables comprise one or more of: memory size; free memory available; storage device capacity; storage device capacity available;
- the hybrid attribute-and-parametric variables comprise one or more of: processor speed and type; memory speed and type; graphics adapter speed and type.

* * * * *